United States Patent
Takahashi

(10) Patent No.: US 10,331,274 B2
(45) Date of Patent: Jun. 25, 2019

(54) LIGHT SOURCE DEVICE, ELECTRONIC BLACKBOARD SYSTEM, AND METHOD OF CONTROLLING LIGHT SOURCE DEVICE

(71) Applicant: NEC Display Solutions, Ltd., Tokyo (JP)

(72) Inventor: Ryoji Takahashi, Tokyo (JP)

(73) Assignee: NEC DISPLAY SOLUTIONS, LTD., Tokyo (JP)

( * ) Notice: Subject to any disclaimer, the term of this patent is extended or adjusted under 35 U.S.C. 154(b) by 0 days.

(21) Appl. No.: 15/502,772

(22) PCT Filed: Sep. 18, 2014

(86) PCT No.: PCT/JP2014/074691
§ 371 (c)(1),
(2) Date: Feb. 8, 2017

(87) PCT Pub. No.: WO2016/042637
PCT Pub. Date: Mar. 24, 2016

(65) Prior Publication Data
US 2017/0228103 A1 Aug. 10, 2017

(51) Int. Cl.
*G06F 3/042* (2006.01)
*G06F 3/041* (2006.01)

(52) U.S. Cl.
CPC .......... *G06F 3/0421* (2013.01); *G06F 3/0416* (2013.01); *G06F 3/0418* (2013.01); *G06F 3/0425* (2013.01)

(58) Field of Classification Search
CPC .... G06F 3/0421; G06F 3/0423; G06F 3/0425; G06F 3/0428; G06F 3/0416; G06F 3/005; G06F 1/1639; G06F 3/0418
See application file for complete search history.

(56) References Cited

U.S. PATENT DOCUMENTS

| | | | | |
|---|---|---|---|---|
| 8,773,352 | B1* | 7/2014 | Huang | G09G 5/00 345/156 |
| 9,746,965 | B2* | 8/2017 | Lin | G06F 3/0425 |
| 2005/0226505 | A1* | 10/2005 | Wilson | G06F 3/0425 382/180 |

(Continued)

FOREIGN PATENT DOCUMENTS

| | | |
|---|---|---|
| JP | H 09-064821 A | 3/1997 |
| JP | 2006-277357 A | 10/2006 |

(Continued)

OTHER PUBLICATIONS

International Search Report (ISR) (PCT Form PCT/ISA/210), in PCT/JP2014/074691, dated Nov. 25, 2014.

(Continued)

*Primary Examiner* — Tom V Sheng
(74) *Attorney, Agent, or Firm* — McGinn I.P. Law Group, PLLC.

(57) ABSTRACT

A light source includes an invisible light emitter that emits an invisible light beam and a visible light emitter that emits a visible light beam. A light source controller causes the light source to emit at least one light beam from among the invisible light beam and the visible light beam. A propagation controller causes an emission light beam emitted from the light source to propagate along a predetermined plane.

20 Claims, 8 Drawing Sheets

(56) References Cited

U.S. PATENT DOCUMENTS

| | | | | |
|---|---|---|---|---|
| 2009/0040178 A1* | 2/2009 | Machida | G06F 3/0346 | 345/158 |
| 2013/0127717 A1* | 5/2013 | Nagashima | G06F 3/0423 | 345/158 |
| 2013/0222237 A1* | 8/2013 | Jesme | G06F 3/0425 | 345/156 |
| 2013/0241890 A1* | 9/2013 | Sharma | G06F 3/0426 | 345/175 |
| 2014/0009443 A1* | 1/2014 | Hung | G06F 3/0425 | 345/175 |
| 2014/0036235 A1* | 2/2014 | Chang | G03B 21/2053 | 353/31 |
| 2014/0362052 A1* | 12/2014 | McCaughan | G06F 3/0418 | 345/175 |
| 2015/0049063 A1* | 2/2015 | Smith | G06F 3/0421 | 345/175 |
| 2015/0237292 A1* | 8/2015 | Tsai | H04N 5/74 | 345/173 |
| 2015/0237319 A1* | 8/2015 | Tsai | G03B 21/208 | 345/175 |
| 2015/0309664 A1* | 10/2015 | Liao | G06F 3/0421 | 345/175 |
| 2015/0355781 A1* | 12/2015 | Lin | G06F 3/0425 | 345/175 |
| 2016/0188122 A1* | 6/2016 | Capps | G06F 3/0425 | 345/175 |
| 2016/0231866 A1* | 8/2016 | Tretter | G06F 3/14 | |
| 2016/0301900 A1* | 10/2016 | Liu | G06F 3/0416 | |
| 2017/0208305 A1* | 7/2017 | Kaneda | H04N 9/3191 | |

FOREIGN PATENT DOCUMENTS

| | | |
|---|---|---|
| JP | 2006-526958 A | 11/2006 |
| JP | 2011-203830 A | 10/2011 |
| JP | 2012-150635 A | 8/2012 |

OTHER PUBLICATIONS

Japanese Office Action dated Nov. 21, 2017 issued in Japanese Application No. 2016-548491 with an English translation thereof.

* cited by examiner

US 10,331,274 B2

LIGHT SOURCE DEVICE, ELECTRONIC BLACKBOARD SYSTEM, AND METHOD OF CONTROLLING LIGHT SOURCE DEVICE

TECHNICAL FIELD

The present invention relates to a light source device, an electronic blackboard system, and a method of controlling the light source device, and more particularly to a light source device, an electronic blackboard system, and a method of controlling the light source device which are for detecting an indicated position on the projection surface of a projector.

BACKGROUND ART

Systems have been developed that use image sensors such as CMOS (Complementary Metal Oxide Semiconductor) sensors, and infrared laser sensors, and as this kind of system, there are electronic blackboard system in which an indicated position, that is indicated by having a finger etc. touch the projection surface of the projector, is recognized; and in which the projector projects an image based on the recognition result.

In such an electronic blackboard system, an infrared laser device is arranged on, e.g., the outer peripheral portion of a screen which is a projection surface of a projector, such that infrared laser light emitted from the device is propagated along a plane parallel to the screen. When the infrared laser light is shielded by a shielding object such as a finger, the infrared laser light reflected by the shielding object is detected by an image sensor, and the indicated position is recognized on the basis of the detection result (see Patent Literature 1).

Some infrared laser devices for electronic blackboard systems are each provided with a laser light source and a propagation control mechanism that scans or diffuses infrared laser light emitted from the laser light source. In such an infrared laser device, a propagation region in which infrared laser light is propagated can be changed by changing the scan angle or the diffusion angle of the infrared laser light. In the above electronic blackboard in which infrared laser light reflected by a shielding object is detected, a recognizable region in which an indicated position can be recognized can be adjusted by changing the propagation region of the infrared laser light.

CITATION LIST

Patent Literature

Patent Literature 1: JP 2011-203830A

SUMMARY OF INVENTION

Technical Problem

When infrared laser light emitted from the infrared laser device is propagated along a plane not parallel to the screen, an indicated position is incorrectly recognized, in some cases. For example, when infrared laser light is emitted in a direction away from the screen surface, an offset distance between the screen surface and a position on a shielding object at which the infrared laser light is applied varies depending on positions on the screen. Accordingly, an indicated position may be incorrectly recognized. Furthermore, when infrared laser light is emitted in a direction approaching the screen surface, not only can an indicated position may be incorrectly recognized due to the variation in the offset distance, but also the infrared laser light emitted from the infrared laser device can be applied directly onto the screen, so that appropriate detection becomes impossible in some cases. Therefore, it is desirable that the recognizable region be adjusted by adjusting the angle or the like of infrared laser light emitted from the infrared laser device, such that the infrared laser light emitted from the infrared laser device is propagated along a plane parallel to the screen surface which is a projection surface of the projector.

However, infrared laser light cannot be directly seen, and the recognizable region cannot therefore be visually checked. Accordingly, in an electronic blackboard system using an infrared laser device with a propagation control mechanism, appropriately adjusting a recognizable region is difficult because the recognizable region cannot be visually adjusted.

When visible light is used instead of infrared laser light, the recognizable region may be viewed. However, in this case, in some projection images projected by the projector, the wavelength of visible light being detected by the image sensor is close to the wavelength of projection light projected from the projector, and the image sensor may mistakenly detect the projection light. As a result, an indicated position may be incorrectly recognized.

An object of the present invention is to provide a light source device, an electronic blackboard system, and a method of controlling the light source device, which are capable of appropriately adjusting a recognizable region in which an indicated position can be recognized, while preventing incorrect recognition of the indicated position.

Solution to Problem

A light source device according to the present invention includes: a light source including an invisible light emitter that emits an invisible light beam and a visible light emitter that emits a visible light beam; a light source controller that causes the light source to emit at least one beam from among the invisible light beam and the visible light beam; and a propagation controller that controls propagation of an emission light beam emitted from the light source.

An electronic blackboard system according to the present invention includes: the light source device; a detecting device that detects reflection light of the invisible light beam reflected by a shielding object; and a projection-type display device that projects an image in accordance with a detection result by the detection device A method according to the present invention is for controlling a light source device which has a light source including an invisible light emitter that emits an invisible light beam and a visible light emitter that emits a visible light beam, and includes: causing the light source to emit at least one beam from among the invisible light beam and the visible light beam; and controlling propagation of an emission light beam emitted from the light source.

Advantage Effects of Invention

According to the present invention, a recognizable region in which an indicated position can be recognized can be appropriately adjusted while incorrect recognition of the indicated position is prevented.

DESCRIPTION OF EMBODIMENTS

Figure 1:
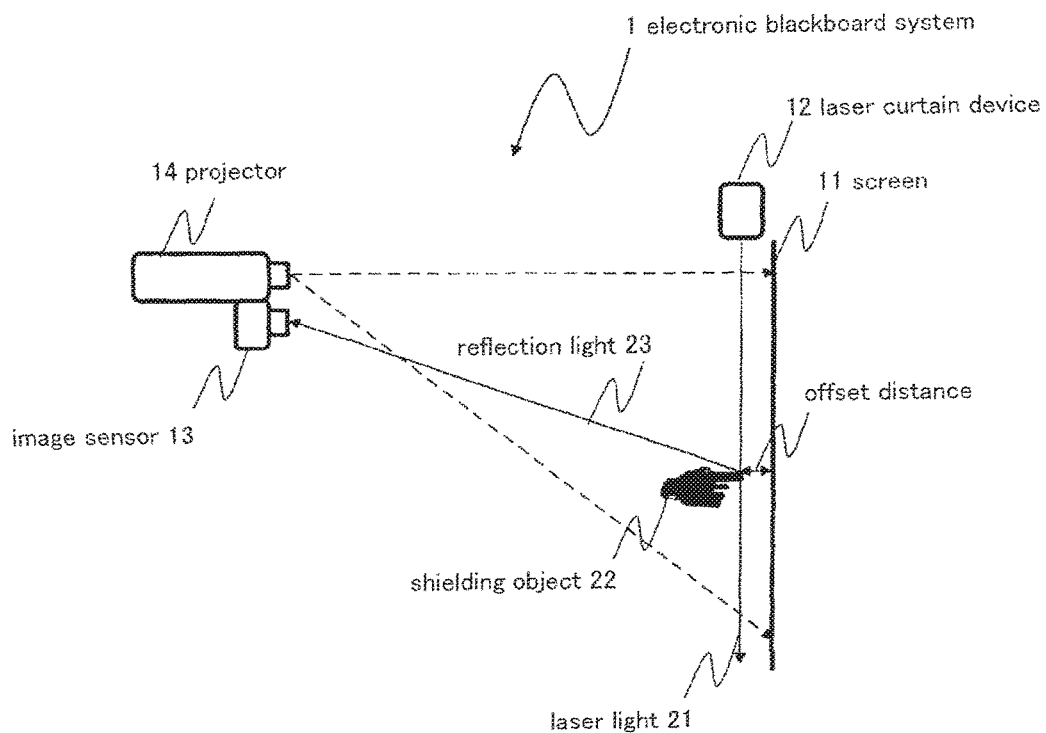
FIG. 1 is a diagram illustrating an electronic blackboard system according to an exemplary embodiment.

Hereinafter, an exemplary embodiment will be described with reference to the drawings. In the description below, components having the same function are denoted by the same reference numeral, and the explanation thereof is omitted in some cases.

FIG. 1 is a diagram illustrating an electronic blackboard system according to the exemplary embodiment. Electronic blackboard system 1 illustrated in FIG. 1 includes screen 11, laser curtain device 12, image sensor 13, and projector 14.

Screen 11 is a projection surface on which a projection image projected from projector 14 is displayed.

Laser curtain device 12 is a light source device that emits laser light 21. Laser curtain device 12 emits, as laser light 21, one or more laser light beams from among a visible laser light beam and an invisible light beam.

Image sensor 13 is a detecting device that detects reflection light 23 of laser light 21 reflected by shielding object 22 such as a finger, when shielding object 22 shields laser light 21. In the present exemplary embodiment, image sensor 13 detects, as reflection light 23, at least the reflection light of infrared laser light reflected by shielding object 22. Image sensor 13 is a CMOS sensor or the like, for example.

Projector 14 is a projection-type display device that projects, onto screen 11, an image according to the detection result by image sensor 13. For example, projector 14 recognizes an indicated position, on screen 11, indicated by shielding object 22, on the basis of the result detected by image sensor 13, and projects an image on which the indicated position is plotted. The recognition manner for recognizing an indicated position may be any manner as long as the detection result by image sensor 13 is used. For example, in this recognition manner, other information (for example, ultrasonic waves) may be used in addition to the detection result by image sensor 13. Further, in the present exemplary embodiment, projector 14 has a design capable of accurately recognizing an indicated position in a case where laser curtain device 12 is disposed such that laser light 21 is propagated in a plane parallel or substantially parallel to screen 11.

Figure 2:
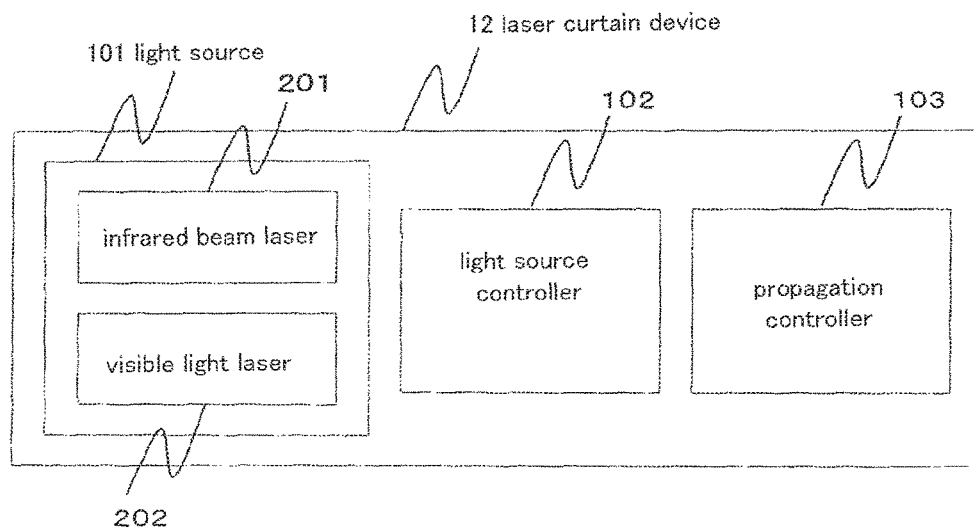
FIG. 2 is a block diagram illustrating a detailed configuration of a laser curtain device.

FIG. 2 is a block diagram illustrating the detailed configuration of laser curtain device 12. As illustrated in FIG. 2, laser curtain device 12 includes light source 101, light source controller 102, and propagation controller 103.

Light source 101 includes infrared beam laser 201 and visible light laser 202. Infrared beam laser 201 is an invisible light emitter that emits infrared laser light as an invisible light beam. Visible light laser 202 is a visible light emitter that emits visible laser light as a visible light beam. In the present exemplary embodiment, it is assumed that infrared beam laser 201 and visible light laser 202 are disposed side by side in a predetermined direction, and emit infrared laser light and visible laser light in the identical direction, respectively.

Light source controller 102 causes light source 101 to emit at least infrared laser light or visible laser light or both infrared and visible laser light. More specifically, light source controller 102 receives, as a selection signal by which an emission light beam to be emitted from light source 101 is selected, a mode selection signal by which an operation mode of laser curtain device 12 is selected, and causes light source 101 to emit at least infrared laser light or visible laser light or both infrared and visible laser light in accordance with the mode selection signal.

In the present exemplary embodiment, it is assumed that the operation modes of laser curtain device 12 include an adjustment mode for adjusting a recognizable region in which an indicated position on screen 11 can be recognized, and an actual operation mode for actually recognizing an indicated position. Further, it is assumed that when receiving a mode selection signal for selecting the adjustment mode as the operation mode, light source controller 102 causes light source 101 to emit visible laser light, and when receiving a mode selection signal for selecting the actual operation mode as the operation mode, light source controller 102 causes light source 101 to emit infrared laser light. When receiving a mode selection signal for selecting the adjustment mode as the operation mode, light source controller 102 may cause light source 101 to emit both visible laser light and infrared laser light.

Figure 3:
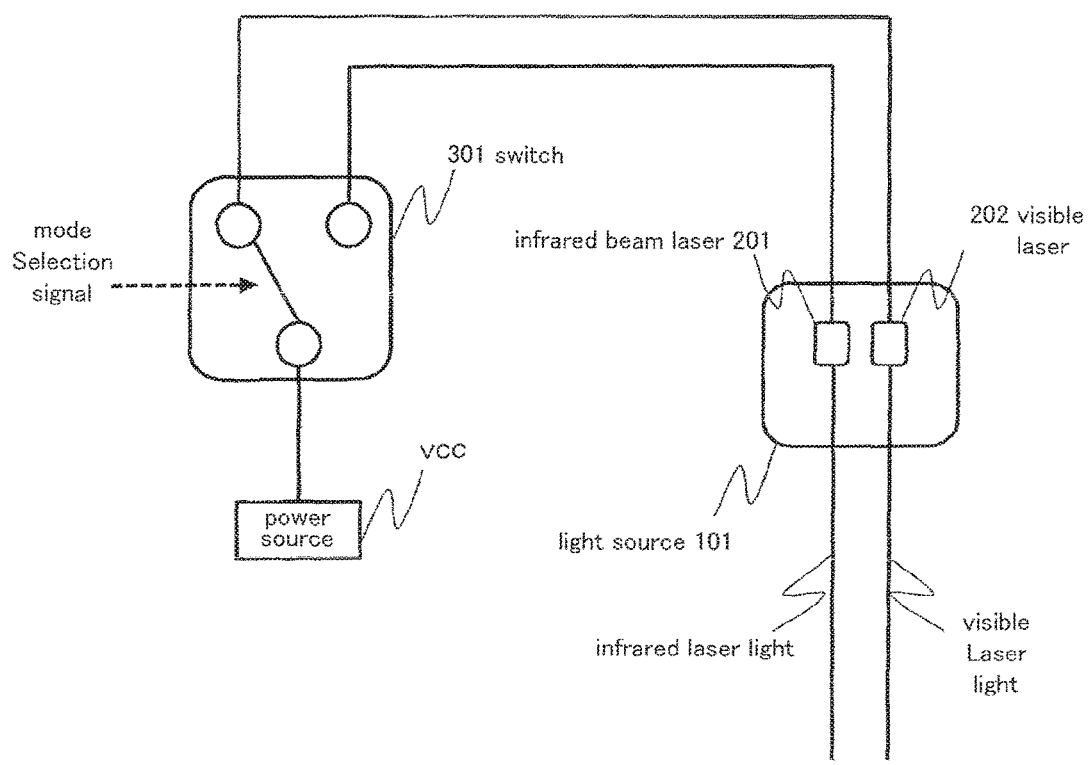
FIG. 3 is a diagram illustrating a configuration example of a light source controller.
Figure 4:
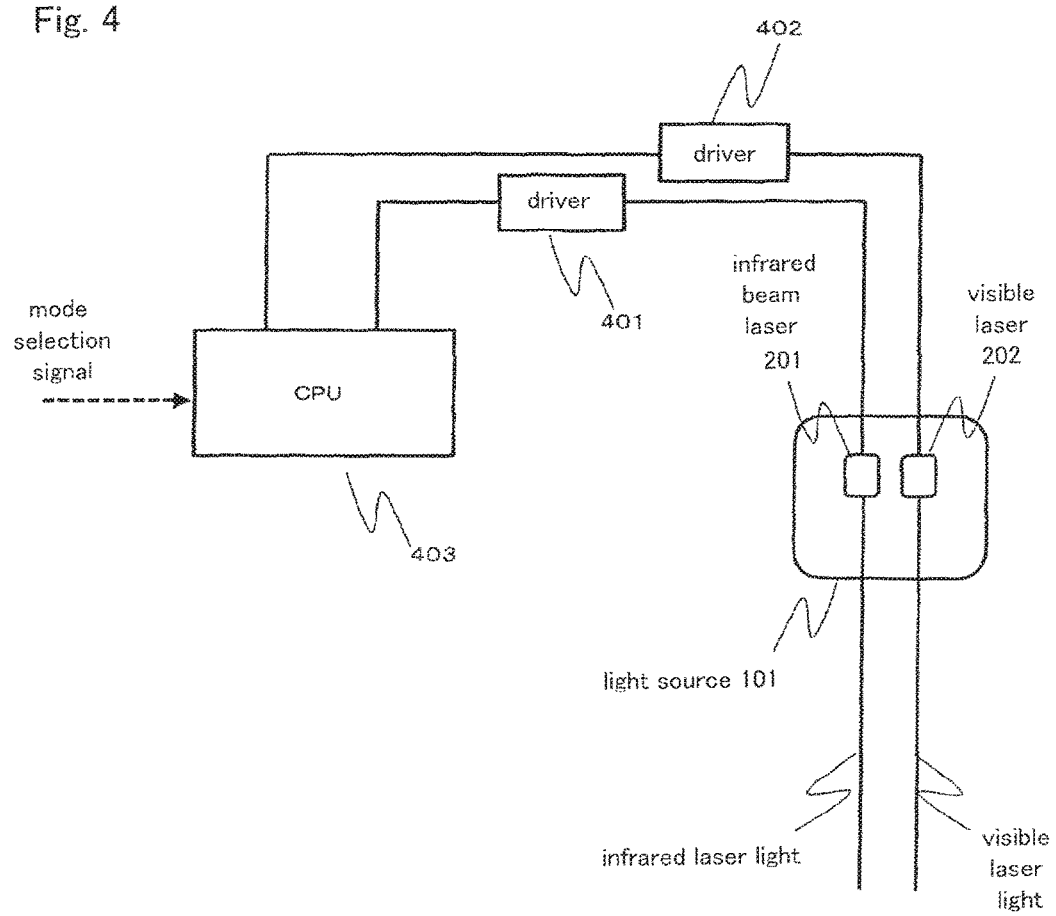
FIG. 4 is a diagram illustrating another configuration example of a light source controller.

FIGS. 3 and 4 are diagrams illustrating the configuration example of light source controller 102.

In the example of FIG. 3, light source controller 102 includes switch 301. Switch 301 is an example of a switcher, and is provided between power source VCC and light source 101. Switch 301 receives a mode selection signal, and connects, to the power source VCC, either infrared beam laser 201 or visible light laser 202 included in light source 101, in accordance with the mode selection signal, and thereby causes light source 101 to emit either infrared laser light or visible laser light.

In the example of FIG. 4, light source controller 102 includes drivers 401 and 402, and CPU (Central Processing Unit) 403.

Driver 401 is a first light emission controller which causes infrared beam laser 201 to emit light. Driver 402 is a second light emission controller which causes visible light laser 202 to emit light. CPU 403 is a driving controller that receives a mode selection signal and drives either driver 401 or 402 in accordance with the mode selection signal, and thereby causes light source 101 to emit either infrared laser light or visible laser light.

In each of the examples of FIG. 3 and FIG. 4, either infrared laser light or visible laser light is emitted. However, in actuality, at least one of infrared laser light and visible laser light may only be emitted, as described above.

The description returns to FIG. 2. Propagation controller 103 controls propagation of emission light emitted from light source 101. More specifically, propagation controller 103 scans or diffuses emission light emitted from light source 101, and to cause the emission light to propagate in a direction parallel or substantially parallel to a predetermined plane. In the design of the present exemplary embodiment, as described above, when laser curtain device 12 is disposed such that laser light 21 is propagated in a plane parallel or substantially parallel to screen 11, an indicated position can be accurately recognized. Accordingly, when the predetermined plane is parallel or substantially parallel to screen 11, the indicated position is accurately recognized by projector 14. Moreover, propagation controller 103 is configured such that a plane, in which infrared laser light which is emission light is propagated, and a plane, in which the visible laser light is propagated, are propagated in the identical or substantially identical propagation region. Propagation controller 103 may receive a propagation-region adjustment signal by which the propagation region is adjusted and thus adjust the propagation region in accordance with the propagation-region adjustment signal.

Here, when respective propagation surfaces, in which infrared laser light and visible laser light are propagated, deviate from each other, and in which the degree of deviation is not sufficient to have any impact on an indicated position recognized on screen 11 on the basis of a detection result by image sensor 13, the propagation surfaces are considered to be substantially identical to each other. The respective propagation surfaces in which infrared laser light and visible laser light are propagated are considered to be substantially identical to each other as long as the propagation surfaces do not have any impact on an indicated position, regardless of whether the propagation surfaces are parallel to each other or not.

Figure 5:
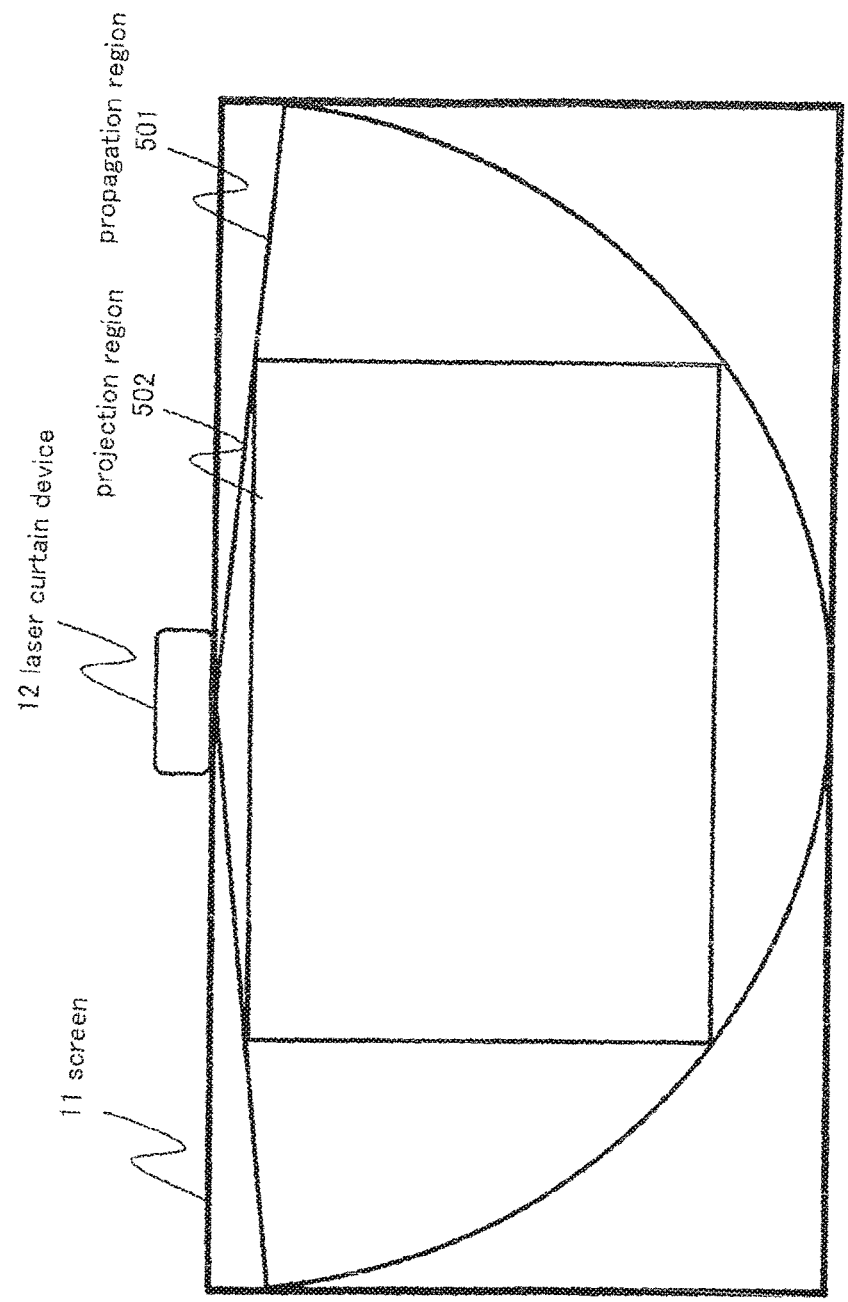
FIG. 5 is diagram illustrating an example of a propagation region.

FIG. 5 is a diagram illustrating an example of the propagation region of emission light. In the example of FIG. 5, laser curtain device 12 is provided on above screen 11, emission light is propagated in a plane parallel to screen 11, and propagation region 501 is adjusted so as to cover projection region 502 in which projector 14 projected an image.

Figure 6:
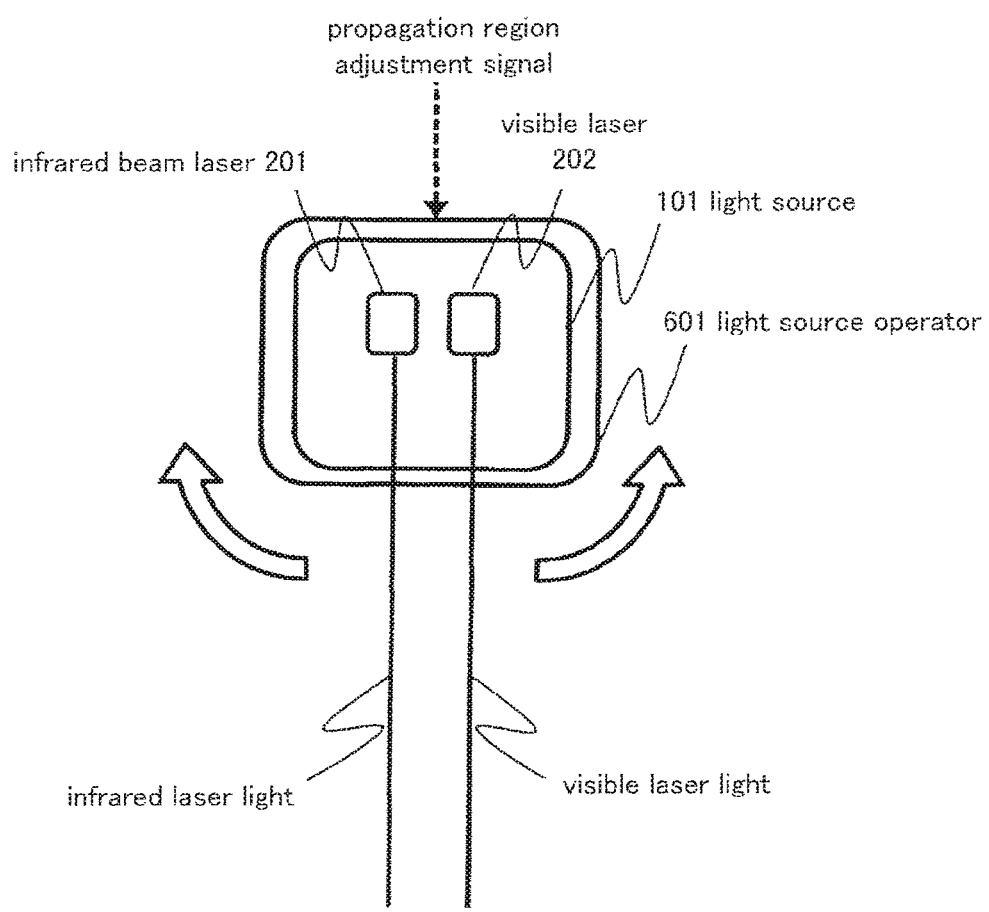
FIG. 6 is a diagram illustrating a configuration example of a propagation controller.
Figure 7:
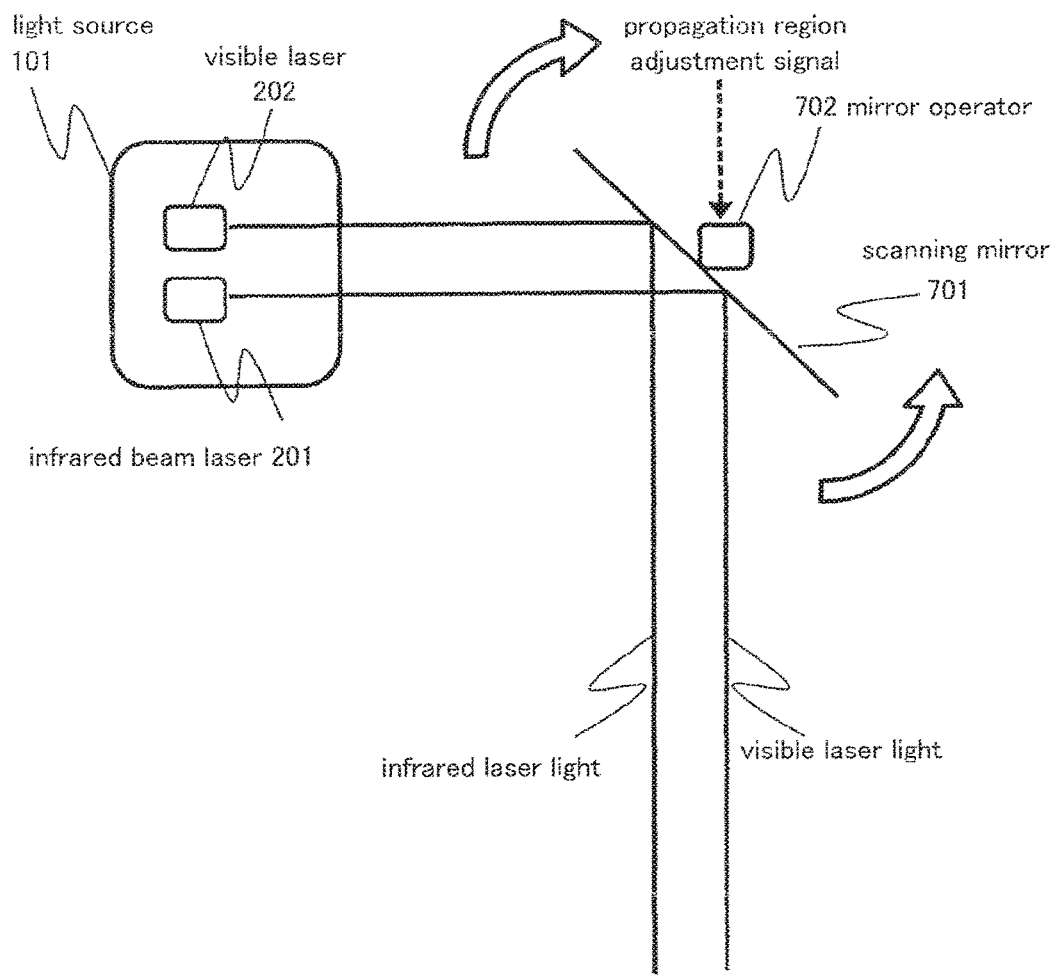
FIG. 7 is a diagram illustrating another configuration example of the propagation controller.
Figure 8:
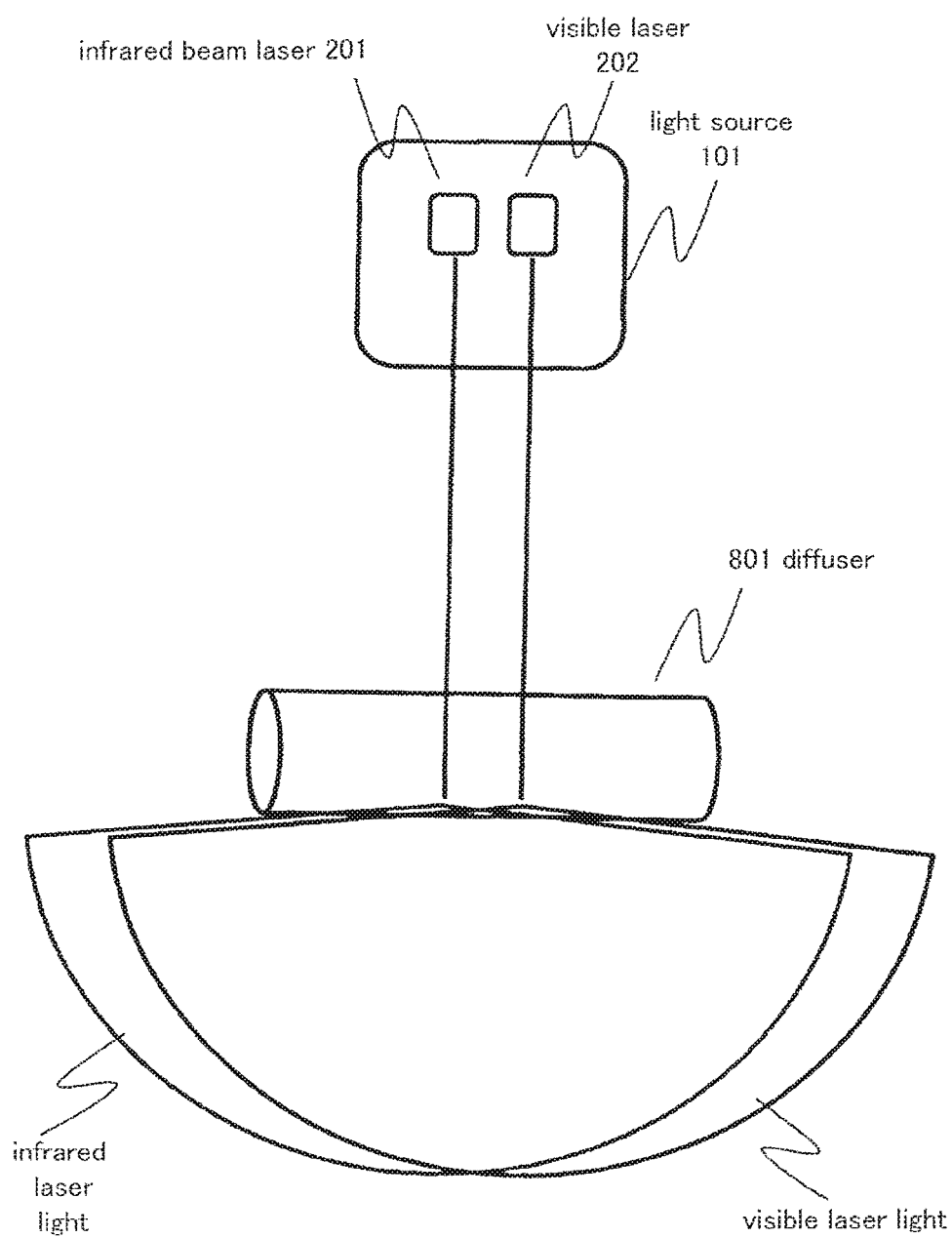
FIG. 8 is a diagram illustrating still another configuration example of the propagation controller.

FIGS. 6 to 8 are diagrams illustrating the configuration examples of propagation controller 103.

In the example of FIG. 6, propagation controller 103 includes light source operator 601. Light source operator 601 vibrates light source 101 about a predetermined vibration axis, and thereby scans emission light from light source 101. In the example in FIG. 6, the predetermined vibration axis is a vertical direction with respect to the sheet. In addition, light source operator 601 receives, as a propagation-region adjustment signal, a signal indicating the scan angle range of emission light from light source 101, and sets the vibration amplitude of light source 101 in accordance with the propagation-region adjustment signal, and thereby adjusts the scan angle range of the emission light from light source 101. Thus, the propagation region of the emission light is adjusted.

In the example of FIG. 7, propagation controller 103 includes scanning mirror 701 and mirror operator 702. Scanning mirror 701 is provided on the optical path of emission light from light source 101, and reflects emission light from light source 101. Mirror operator 702 vibrates scanning mirror 701 about a predetermined vibration axis, and thereby scans emission light emitted from light source 101. The direction of the vibration axis of scanning mirror 701 is vertical with respect to the sheet, as in the example of FIG. 6. Mirror operator 702 receives, as a propagation-region adjustment signal, a signal indicating the scan angle range of emission light from light source 101, and sets the vibration amplitude of scanning mirror 701 in accordance with the propagation-region adjustment signal to adjust the scan angle range of the emission light from light source 101, and thereby adjusts the propagation region of the emission light.

In the example of FIG. 8, propagation controller 103 includes diffuser 801. Diffuser 801 is provided on the optical path of emission light from light source 101, and diffuses and emits the emission light. For example, diffuser 801 emits emission light by diffusing the emission light in a predetermined primary direction. Further, diffuser 801 may receive, as a propagation-region adjustment signal, a signal indicating the diffusion angle at which emission light is to be diffused, and thus adjust the diffusion angle in accordance with the propagation-region adjustment signal, and thereby adjust the propagation region of the emission light.

Figure 9:
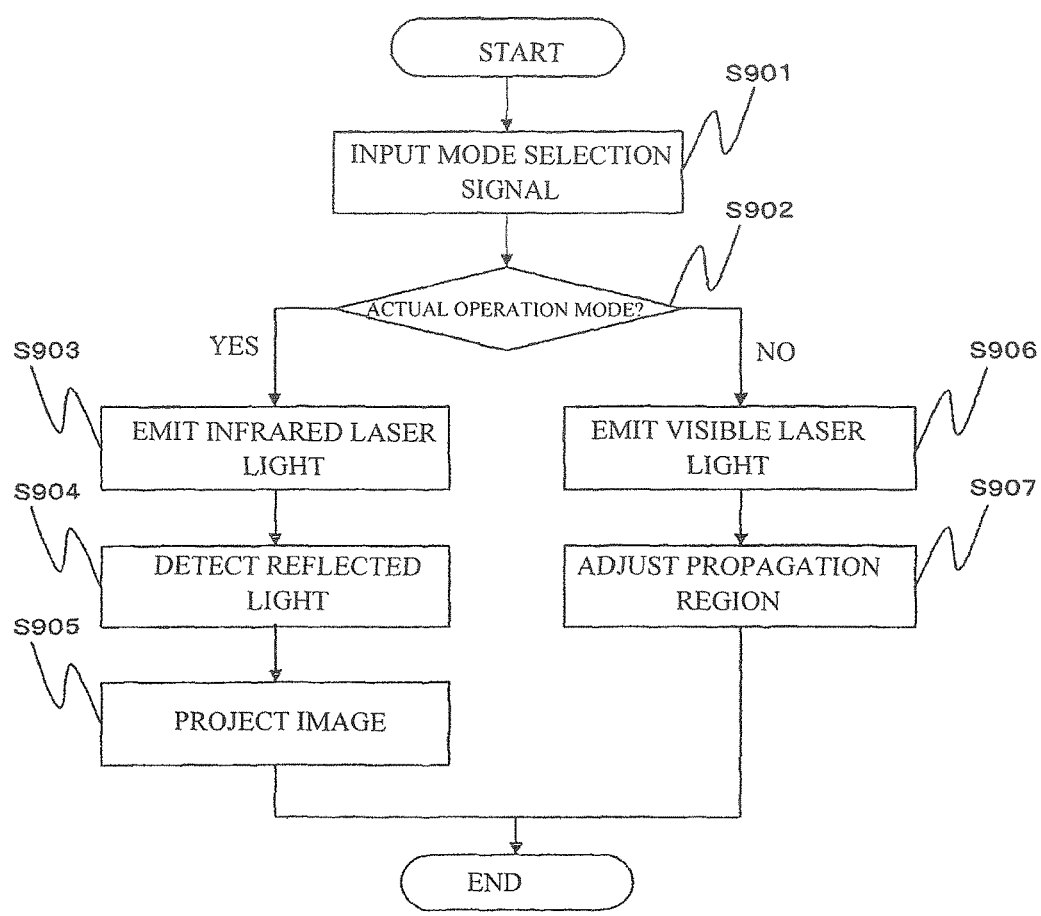
FIG. 9 is a flowchart showing an example of operations of the electronic blackboard system according to the exemplary embodiment.

FIG. 9 is a flowchart showing operations of electronic blackboard system 1.

First, a mode selection signal is inputted to light source controller 102 of laser curtain device 12 (step S901). Laser curtain device 12 may be provided with an input device such as a switch or a button for input of a mode selection signal, or may be provided with a communication device which receives a mode selection signal from a different external device (not illustrated) such as projector 14 or a PC.

Light source controller 102 determines whether or not the inputted mode selection signal indicates an actual operation mode (step S902).

When the mode selection signal indicates an actual operation mode, light source controller 102 causes light source 101 to emit infrared laser light (step S903).

In this case, propagation controller 103 causes the emitted infrared laser light to propagate in a predetermined plane. When the emitted infrared laser light is shielded by shielding object 22, image sensor 13 detects the infrared laser light reflected by shielding object 22 (step S904). Image sensor 13 outputs, to projector 14, a detection signal indicating the detection result. When receiving the detection signal, projector 14 projects an image according to the detection signal onto screen 11 (step S905).

When the mode selection signal does not indicate an actual operation mode at step S902, that is, when the mode selection signal indicates an adjustment mode, light source controller 102 causes light source 101 to emit visible laser light (step S906). When receiving a propagation-region adjustment signal, propagation controller 103 adjusts the propagation region in accordance with the propagation-region adjustment signal (step S907).

According to the present exemplary embodiment, as described above, light source 101 includes infrared beam laser 201 that emits infrared laser light and visible light laser 202 that emits visible laser light. Light source controller 102 causes light source 101 to emit infrared laser light or visible laser light or both infrared and visible laser light. Propagation controller 103 controls propagation of an emission light beam emitted from light source 101. Accordingly, infrared laser light or visible laser light or both infrared and visible laser light is emitted. Thus, when visible laser light is emitted, the propagation region of the laser light, that is, the recognizable region in which an indicated position can be recognized, can be adjusted, and the time when infrared laser light is emitted, an indicated position can be actually recognized. Therefore, a recognizable region in which an indicated position can be recognized can be appropriately adjusted, while incorrect recognition of the indicated position is prevented.

Each of the configurations illustrated in the exemplary embodiment described above is merely an example, and the present invention is not limited to the configurations.

For example, infrared beam laser 201 and visible light laser 202 are disposed side by side, and each emit laser light in an identical direction, in the exemplary embodiment described above. However, as a modification, infrared beam laser 201 and visible light laser 202 may emit laser light in different directions. In this case, light source 101 further includes, in addition to infrared beam laser 201 and visible light laser 202, an optical element such as a dichroic prism which emits infrared laser light from infrared beam laser 201 and visible laser light from visible light laser 202 in an identical direction, for example.

Further, in adjustment of a recognizable region, not only the two-dimensional adjustment described with reference to FIGS. 6 to 8, but also three-dimensional adjustment may be performed, for example. In the case of the example in FIG. 6, for example, light source operator 601 may adjust the propagation region of emission light into a three-dimensional direction by setting the vibration amplitude and the inclination of the vibration axis in accordance with a propagation-region adjustment signal, and thereby adjust the recognizable region into the three-dimensional direction. Alternatively, as a matter of course, a user of the electronic blackboard system may adjust the recognizable region by adjusting the set position or the set angle of laser curtain device 12.

Although all or part of the above exemplary embodiment is described in the following supplements, the present invention is not limited to the following.

(Supplement 1)

A light source device comprising:

a light source including an invisible light emitter that emits an invisible light beam and a visible light emitter that emits a visible light beam;

a light source controller that causes the light source to emit at least one light beam from among the invisible light beam and the visible light beam; and a propagation controller that controls propagation of an emission light beam emitted from the light source.

(Supplement 2)

The light source device according to Supplement 1, wherein a plane in which the invisible light beam is propagated is identical or substantially identical to a plane in which the visible light beam is propagated.

(Supplement 3)

The light source device according to Supplement 1 or 2, wherein the invisible light emitter and the visible light emitter are disposed side by side in a predetermined direction.

(Supplement 4)

The light source device according to any one of Supplements 1 to 3, wherein the light source controller causes the light source to emit at least one light beam from among the invisible light beam and the visible light beam, in accordance with a selection signal by which an emission light beam to be emitted from the light source is selected.

(Supplement 5)

The light source device according to any one of Supplements 1 to 4, wherein the light source controller includes a switcher that connects at least one light emitters, from among the invisible light emitter and the visible light emitter, to a power source, and thereby causes the light source to emit at least one light beam from among the invisible light beam and the visible light beam.

(Supplement 6)

The light source device according to any one of Supplements 1 to 4, wherein the light source controller includes a first light emission controller that causes the invisible light emitter to emit light, a second light emission controller that causes the visible light emitter to emit light, and a driving controller that drives at least one light emission controller from among the first light emission controller and the second light emission controller, and thereby causes the light source to emit at least one light beam from among the invisible light beam and the visible light beam.

(Supplement 7)

The light source device according to any one of Supplements 1 to 6, wherein the propagation controller scans the emission light beam.

(Supplement 8)

The light source device according to Supplement 7, wherein the invisible light emitter and the visible light emitter are disposed side by side inside the light source, and the propagation controller scans the emission light by vibrating the light source.

(Supplement 9)

The light source device according to Supplement 7, wherein the propagation controller includes a mirror that reflects the emission light, and a mirror operator that scans the emission light by vibrating the mirror.

(Supplement 10)

The light source device according to any one of Supplements 1 to 6, wherein the propagation controller causes the emission light beam to propagate along the plane by diffusing the emission light.

(Supplement 11)

An electronic blackboard system comprising:

the light source device according to any one of Supplements 1 to 10;

a detecting device that detects reflection light of the invisible light beam reflected by a shielding object; and a projection-type display device that projects an image in accordance with a detection result by the detection device.

(Supplement 12)

A method of controlling a light source device having a light source including an invisible light emitter that emits an invisible light beam and a visible light emitter that emits a visible light beam, the method comprising:

causing the light source to emit at least one light beam from among the invisible light beam and the visible light beam; and causing an emission light beam emitted from the light source to propagate along a predetermined plane.

REFERENCE SIGNS LIST

1 electronic blackboard system
11 screen
12 laser curtain device
13 image sensor
14 projector
101 light source
102 light source controller
103 propagation controller
201 infrared beam laser
202 visible light laser
301 switch
401 driver
402 driver 403 CPU
601 light source operator
701 scanning mirror
702 mirror operator
801 diffuser

The invention claimed is:

1. An electronic blackboard system comprising:
a projection-type display device that projects an image on a projection surface;
a light source device that emits invisible light; and
a detecting device that detects reflection light of the invisible light reflected by a shielding object,
wherein said light source device includes:
a light source including an invisible light emitter that emits the invisible light and a visible light emitter that emits visible light; and
a propagation controller that causes the invisible light to propagate in a direction parallel or substantially parallel to the projection surface,
wherein a plane, in which the invisible light propagates, is identical or substantially identical to a plane in which the visible light propagates,
wherein the visible light is used for configuring the light source device, and
wherein the invisible light and the visible light are emitted in an identical direction, respectively.

2. The electronic blackboard system according to claim 1, further comprising a first mode and a second mode,
wherein when the first mode is selected, said light source device emits the invisible light, and when the second mode is selected, said light source device emits the visible light or both the invisible light and the visible light.

3. The electronic blackboard system according to claim 2, wherein when the first mode is selected, said detecting device detects the reflection light.

4. The electronic blackboard system according to claim 3, wherein when the first mode is selected, said projection-type display device projects an image in accordance with a detection result by said detecting device.

5. The electronic blackboard system according to claim 2, wherein when the second mode is selected, said propagation controller adjusts a region in which the visible light propagates.

6. The electronic blackboard system according to claim 2, wherein said light source device further includes an input device, and
wherein the first mode or the second mode is selected by using said input device.

7. The electronic blackboard system according to claim 1, wherein said light source device further includes a light source controller, and
wherein said light source controller causes said light source to emit at least one light from among the invisible light and the visible light.

8. The electronic blackboard system according to claim 1, wherein said propagation controller scans the invisible light and the visible light.

9. The electronic blackboard system according to claim 1, wherein said propagation controller diffuses the invisible light and the visible light.

10. The electronic blackboard system according to claim 1, wherein the invisible light comprises an infrared ray.

11. The electronic blackboard system according to claim 1, wherein the propagation controller adjusts a region in which the visible light propagates of emission light into a three-dimensional direction by setting a vibration amplitude and an inclination of a vibration axis in accordance with a propagation-region adjustment signal, and thereby adjusts a recognizable region into the three-dimensional direction.

12. A light source device used in an electronic blackboard system including: a projection-type display device that projects an image on a projection surface; a light source device that emits invisible light; and a detecting device that detects reflection light of the invisible light reflected by a shielding object, said light source device comprising:
a light source including an invisible light emitter that emits the invisible light and a visible light emitter that emits visible light; and
a propagation controller that causes the invisible light to propagate in a direction parallel or substantially parallel to the projection surface,
wherein a plane, in which the invisible light propagates, is identical or substantially identical to a plane in which the visible light propagates,
wherein the visible light is used for configuring the light source device, and
wherein the invisible light and the visible light are emitted in an identical direction, respectively.

13. The light source device according to claim 12, further comprising a first mode and a second mode,
wherein when the first mode is selected, said light source emits at least the invisible light, and when the second mode is selected, said light source emits at least the visible light.

14. The light source device according to claim 13, wherein when the second mode is selected, said propagation controller adjusts a region in which the visible light propagates.

15. A method of controlling an electronic blackboard system in which an image is projected on a projection surface and an indicated position on the projection surface which is indicated by a shielding object is recognized, said method comprising:
emitting invisible light and visible light; and
causing the invisible light to propagate in a direction parallel or substantially parallel to the projection surface,
wherein a plane, in which the invisible light propagates, is identical or substantially identical to a plane in which the visible light propagates,
wherein the visible light is used for configuring a light source device in the electronic blackboard system, and
wherein the invisible light and the visible light are emitted in an identical direction, respectively.

16. The method according to claim 15, further comprising:
receiving an operation mode;
recognizing the indicated position when the operation mode indicates a first mode; and
adjusting a recognizable region, in which the indicated position can be recognized, when the operation mode indicates a second mode.

17. The method according to claim 16, further comprising:
emitting the invisible light when the operation mode indicates the first mode; and
emitting the visible light when the operation mode indicates the second mode.

18. The method according to claim 16, further comprising detecting reflection light of the invisible light reflected by said shielding object when the operation mode indicates the first mode.

19. The method according to claim 16, further comprising projecting an image in accordance with the indicated position when the operation mode indicates the first mode.

20. The method according to claim 16, wherein when the second mode is selected, adjusting a region in which the visible light propagates.

* * * * *